US008290203B1

(12) United States Patent
Myers et al.

(10) Patent No.: US 8,290,203 B1
(45) Date of Patent: Oct. 16, 2012

(54) APPARATUS AND METHOD FOR DETECTING IMAGES WITHIN SPAM

(75) Inventors: John Gardiner Myers, Santa Clara, CA (US); Yanyan Yang, Sunnyvale, CA (US)

(73) Assignee: Proofpoint, Inc., Sunnyvale, CA (US)

(*) Notice: Subject to any disclaimer, the term of this patent is extended or adjusted under 35 U.S.C. 154(b) by 863 days.

(21) Appl. No.: 11/652,715

(22) Filed: Jan. 11, 2007

(51) Int. Cl.
*G06K 9/00* (2006.01)

(52) U.S. Cl. ........ 382/100; 382/181; 382/224; 709/206; 726/26

(58) Field of Classification Search ............... 382/100, 382/181, 224, 305–306; 709/200, 202; 726/22, 726/26
See application file for complete search history.

(56) References Cited

U.S. PATENT DOCUMENTS

| | | | |
|---|---|---|---|
| 5,465,353 A * | 11/1995 | Hull et al. ............... | 1/1 |
| 5,721,788 A | 2/1998 | Powell et al. | |
| 5,872,865 A * | 2/1999 | Normile et al. ........... | 382/224 |
| 5,893,095 A * | 4/1999 | Jain et al. ................. | 1/1 |
| 5,899,999 A * | 5/1999 | De Bonet .................. | 1/1 |
| 5,913,205 A | 6/1999 | Jain et al. | |
| 5,937,084 A | 8/1999 | Crabtree et al. | |
| 5,963,670 A | 10/1999 | Lipson et al. | |
| 6,175,829 B1 | 1/2001 | Li et al. | |
| 6,389,424 B1 | 5/2002 | Kim et al. | |
| 6,415,282 B1 * | 7/2002 | Mukherjea et al. ......... | 707/737 |
| 6,847,733 B2 * | 1/2005 | Savakis et al. ............. | 382/225 |
| 7,089,241 B1 | 8/2006 | Alspector et al. | |
| 7,437,408 B2 | 10/2008 | Schwartz et al. | |
| 7,475,061 B2 * | 1/2009 | Bargeron et al. ........... | 1/1 |
| 7,624,274 B1 | 11/2009 | Alspector et al. | |
| 7,715,059 B2 * | 5/2010 | Advocate et al. .......... | 358/405 |
| 7,716,297 B1 * | 5/2010 | Wittel et al. ................ | 709/206 |
| 7,817,861 B2 * | 10/2010 | Lee .............................. | 382/209 |
| 8,103,048 B2 * | 1/2012 | Sheinin et al. ............. | 382/100 |
| 2001/0004739 A1 * | 6/2001 | Sekiguchi et al. ......... | 707/100 |
| 2001/0039563 A1 * | 11/2001 | Tian ........................... | 709/202 |
| 2002/0032672 A1 * | 3/2002 | Keith, Jr. ...................... | 707/2 |
| 2002/0180764 A1 | 12/2002 | Gilbert et al. | |
| 2003/0053718 A1 | 3/2003 | Yamamoto | |
| 2003/0123737 A1 * | 7/2003 | Mojsilovic et al. ......... | 382/224 |
| 2003/0174893 A1 | 9/2003 | Sun et al. | |
| 2003/0215135 A1 | 11/2003 | Caron et al. | |
| 2004/0148330 A1 | 7/2004 | Alspector et al. | |
| 2004/0153517 A1 | 8/2004 | Gang et al. | |
| 2004/0260776 A1 * | 12/2004 | Starbuck et al. ........... | 709/206 |
| 2005/0030589 A1 | 2/2005 | El-Gazzar et al. | |
| 2005/0050150 A1 * | 3/2005 | Dinkin ........................ | 709/207 |
| 2005/0060643 A1 | 3/2005 | Glass et al. | |
| 2005/0216564 A1 | 9/2005 | Myers et al. | |

(Continued)

OTHER PUBLICATIONS

Cormen, Thomas H. et al. "Introduction to Algorithms", 2000, McGraw-Hill Book Company, p. 221-226.*

(Continued)

*Primary Examiner* — Jason M Repko
*Assistant Examiner* — Gandhi Thirugnanam
(74) *Attorney, Agent, or Firm* — Blakely, Sokoloff, Taylor & Zafman, LLP

(57) ABSTRACT

A method is described that includes comparing a characteristic of an image to stored characteristics of spam images. The method also includes generating a signature of the present image. The method further includes comparing the signature of the present image to stored signatures of spam images. The method also includes determining the spam features corresponding to the stored signatures of spam images that match the signature of the present image.

15 Claims, 13 Drawing Sheets

U.S. PATENT DOCUMENTS

| | | | |
|---|---|---|---|
| 2006/0092292 A1 | 5/2006 | Matsuoka et al. | |
| 2006/0093221 A1* | 5/2006 | Kasutani | 382/191 |
| 2006/0123083 A1 | 6/2006 | Goutte et al. | |
| 2006/0168006 A1 | 7/2006 | Shannon et al. | |
| 2006/0168041 A1 | 7/2006 | Mishra et al. | |
| 2006/0184574 A1* | 8/2006 | Wu et al. | 707/104.1 |
| 2006/0190481 A1 | 8/2006 | Alspector et al. | |
| 2008/0002914 A1 | 1/2008 | Vincent et al. | |
| 2008/0002916 A1 | 1/2008 | Vincent et al. | |
| 2008/0063279 A1* | 3/2008 | Vincent et al. | 382/182 |
| 2008/0091765 A1* | 4/2008 | Gammage et al. | 709/202 |
| 2008/0127340 A1* | 5/2008 | Lee | 726/22 |
| 2008/0130998 A1* | 6/2008 | Maidment et al. | 382/181 |
| 2008/0159632 A1* | 7/2008 | Oliver et al. | 382/209 |
| 2008/0178288 A1* | 7/2008 | Alperovitch et al. | 726/22 |
| 2008/0219495 A1* | 9/2008 | Hulten et al. | 382/100 |
| 2009/0043853 A1* | 2/2009 | Wei et al. | 709/206 |
| 2009/0100523 A1* | 4/2009 | Harris | 726/26 |
| 2009/0110233 A1* | 4/2009 | Lu et al. | 382/100 |
| 2009/0113003 A1* | 4/2009 | Lu et al. | 709/206 |
| 2009/0141985 A1* | 6/2009 | Sheinin et al. | 382/202 |
| 2009/0220166 A1* | 9/2009 | Choi et al. | 382/260 |
| 2009/0245635 A1 | 10/2009 | Yehezkel et al. | |
| 2012/0087586 A1* | 4/2012 | Sheinin et al. | 382/173 |

OTHER PUBLICATIONS

Randal Schwartz, "Finding Similar Images, Linux Magazine, Friday, Aug. 15, 2003," www.linux-mag.com/index.php?option=com_content&task=view&id=1424&Itemid=2210, pp. 1-6.

"A New Wave of Spam", http://www.symantec.com/business/resources/articles/article.jsp?aid=new_wave_of_spam, (May 7, 2007).

Aradhye, H.B., et al., "Image Analysis for Efficient Categorization of Image-Based Spam e-mail", Proceedings of the 2005 Eighth International Conference on Document Analysis and Recognition (ICDAR '05), (2005).

Burton, Brian, "SpamProbe—Bayesian Spam Filtering Tweaks", http://web.archive.org/web/20060207003157/http://spamprobe.sourceforge.net/, (2006), 1-5.

Johnson, Neil F., "In Search of the Right Image: Recognition and Tracking of Images in Image Databases, Collections, and The Internet", Center for Secure Information Systems Technical Report CSIS-TR-99-05NFJ., (Apr. 1999), 1-13.

Wu, C.T., et al., "Using Visual Features for Anti-Spam Filtering", IEEE International Conference on Image Processing, vol. 3, (2005), 509-512.

* cited by examiner

Vector 1
Vector 2

$$\begin{aligned} &\{240\quad 132\quad 64\quad 96\quad 12\quad 198\quad 253\quad 102\} \\ -&\{240\quad 139\quad 62\quad 95\quad 12\quad 210\quad 251\quad 101\} \end{aligned}$$

Difference $\{0\quad -7\quad 2\quad 1\quad 0\quad -12\quad 2\quad 1\}$

Absolute Difference $\{0\quad 7\quad 2\quad 1\quad 0\quad 12\quad 2\quad 1\}$

Sum  $0 + 7 + 2 + 1 + 0 + 12 + 2 + 1 = 25$

Threshold  40

Sum < Threshold (25 < 40) => Vector 1 and Vector 2 "match"

Fig. 6A

APPARATUS AND METHOD FOR DETECTING IMAGES WITHIN SPAM

BACKGROUND OF THE INVENTION

1. Field of the Invention

This invention relates to electronic message analysis and filtering. More particularly, the invention relates to a system and method for improving a spam filtering feature set.

2. Description of the Related Art

"Spam" is commonly defined as unsolicited bulk e-mail, i.e., email that was not requested (unsolicited) and sent to multiple recipients (bulk). Although spam has been in existence for quite some time, the amount of spam transmitted over the Internet and corporate local area networks (LANs) has increased significantly in recent years. In addition, the techniques used by "spammers" (those who generate spam) have become more advanced in order to circumvent existing spam filtering products.

Spam represents more than a nuisance to corporate America. Significant costs are associated with spam including, for example, lost productivity and the additional hardware, software, and personnel required to combat the problem. In addition, many users are bothered by spam because it interferes with the amount of time they spend reading legitimate e-mail. Moreover, because spammers send spam indiscriminately, pornographic messages may show up in e-mail inboxes of workplaces and children—the latter being a crime in some jurisdictions.

Spam filters attempt to remove spam without removing valid e-mail messages from incoming traffic. For example, spam filters scan email message headers, metatag data, and/or the body of messages for words that are predominantly be used in spam, such as "Viagra" or "Enlargement." Current email filters may also search for images which are known to be used in spam messages. Hashing algorithms such as MD5 are used to generate image "fingerprints" which uniquely identify known spam images.

Over the years, spammers have become more creative in disguising their messages, e-mails, or advertisements as legitimate incoming traffic to avoid detection by spam filters. Specifically, spammers typically obfuscate words which would normally be identified by spam filters. For example, "Viagra" may be spelled "V!agra" or "Enlargement" may be spelled "En!@rgement." With respect to images, spammers often embed random data within spam images to modify the image fingerprint, and thereby avoid detection.

Thus, improved mechanisms for detecting obfuscated images within email messages are needed.

BRIEF DESCRIPTION OF THE DRAWINGS

A better understanding of the present invention can be obtained from the following detailed description in conjunction with the following drawings, in which:

FIG. 6A illustrates a specific example of comparing two vectors during the Fuzzy80 algorithm of FIG. 3.

DETAILED DESCRIPTION OF PREFERRED EMBODIMENTS

Described below is a system and method for detecting images used in spam. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Message Filtering Apparatus

Figure 1:
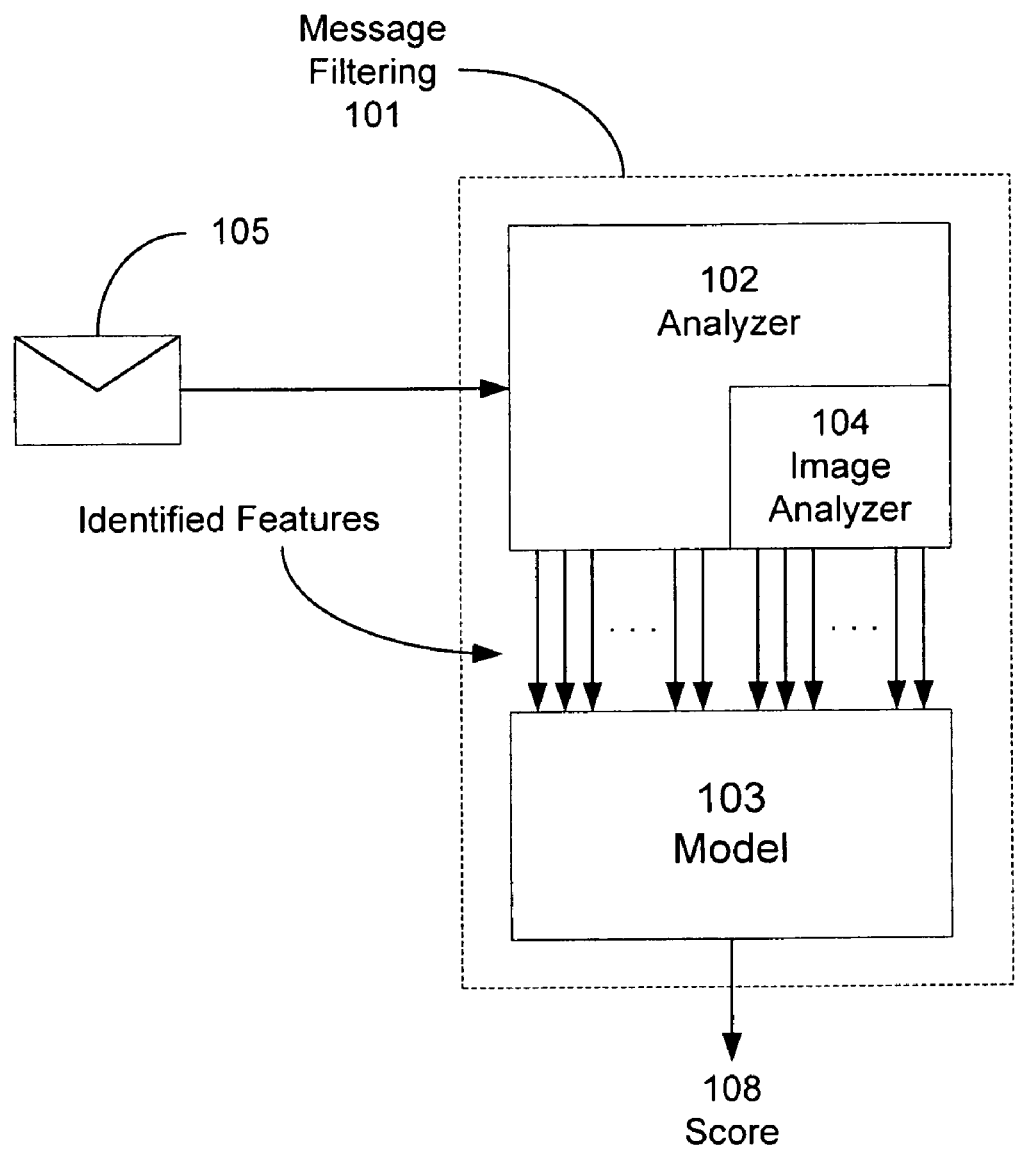
FIG. 1 illustrates a message filtering apparatus.

FIG. 1 depicts an exemplary message filtering apparatus 101 on which the embodiments of the invention described below may be implemented. As depicted, the message filtering apparatus includes an email analyzer 102 and a model 103. The email analyzer 102 includes an image analyzer component 104 which implements the techniques described herein to identify spam images.

When an email 105 including an image is received by the message filtering apparatus 101, as shown in FIG. 1, the email as a whole is scanned by the analyzer 102, and the image portion of the email is scanned by the image analyzer 104. The analyzer 102 determines whether the email 105 contains known spammy "features"—i.e., characteristics of an email which are known to be found in spam. For example, the analyzer 102 may determine that the email 105 includes the phrase, "get results fast!" or the word "Viagra." Image "fingerprints" are also stored as features and identified by the image analyzer component 104.

Once the features of an email message have been identified, a mathematical model 103 is used to apply "weights" to each of the features. Features which are known to be a relatively better indicator of spam are given a relatively higher weight than other features. The feature weights are determined via "training" of classification algorithms such as Naïve Bayes, Logistic Regression, Neural Networks, etc.

The combined weights are then used to arrive at a spam "score" 108. If the score is above a specified threshold value, then the email is classified as spam and filtered out of the email stream. By contrast, if the score is below the specified value, then email is forwarded on to a user's email account.

The embodiments of the invention described below focus on the manner in which the image analyzer 104 identifies image features within email messages. It should be noted that not all of the specific operations set forth below are needed for complying with the underlying principles of the invention. Furthermore, the discussion below is not inclusive of all methods, steps, or processes covered by the present invention.

The Image Analyzer

Figure 2:
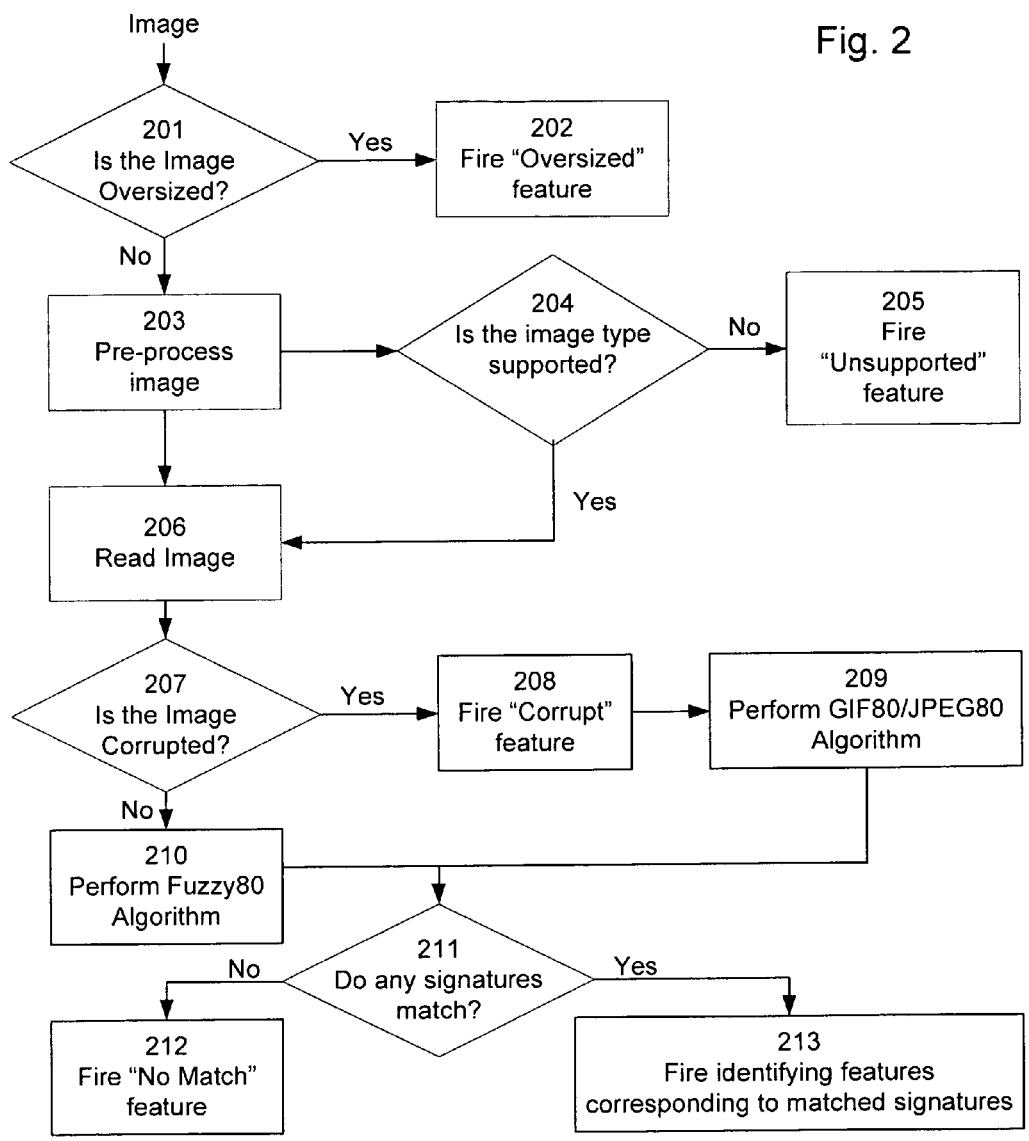
FIG. 2 illustrates an example method of the image analyzer of the message filtering apparatus.

FIG. 2 illustrates one embodiment of a method executed by the image analyzer to identify image features. The image analyzer first determines if the image is "oversized" at 201 (e.g., above a specified threshold value). Spam images are typically small so that individuals on dial-up internet connections will be able to quickly view spam in their email accounts. Moreover, given that service providers may cap the amount of information that may be sent by an individual user, spammers conserve bandwidth by using smaller images.

If the image from email 105 is oversized, then an "oversized" feature is fired by the image analyzer 104 at 202 and no further image analysis is performed. If the image is not "oversized", then the image is pre-processed at 203. In one embodiment, pre-processing includes obtaining the image format, image width, image height and/or image size. Then the image analyzer 104 determines whether the image is in a supported format at 204 (e.g., a format which the image analyzer is capable of analyzing). Examples of supported formats are Graphic Interchange Format ("GIF") and Joint Photographic Experts Group ("JPEG") images. If so, the image data is read by the image processing application at 206. If the image is unsupported, then an "unsupported" feature is fired at 205 and the process terminates.

As described below, in one embodiment of the invention, the image format and image width are used as a hash key to an image fingerprint hash table.

For GIFs and JPEGs, the width is relatively straightforward to determine. Once the image is pre-processed at 203, then the image data of the image is read and analyzed at 206. In one embodiment of the present invention, ImageMagick™ is the program used to read the image data. However, various other image processing programs may be used while still complying with the underlying principles of the invention (e.g., Adobe Photoshop, Corel Draw, Paint Shop Pro).

After the image data is read at 206, the image analyzer 104 determines if the image is corrupted at 207. Spammers may "corrupt" an image by making the image unreadable by filters. For example, a spammer may change the format or embed data within the image so that the reader in 206 is unable to read the image data.

In one embodiment of the invention, if the image is corrupted, then the image analyzer 104 fires a "corrupt" feature at 208 in response to being unable to read the image data. At 209, the image analyzer 104 performs a "GIF/JPEG Feature Detection Algorithm" (hereinafter "GIF80/JPEG80") to create a signature for the image and to search for a match for the signature. The "GIF80/JPEG80" algorithm is described in detail below.

By contrast, if the image is not corrupted, the image analyzer 104 executes a "Fuzzy Feature Detection Algorithm" (hereinafter "Fuzzy80") to create a different signature for the image and to search for a match for the signature. In this embodiment, computing resources are conserved because the GIF80/JPEG80 algorithm is more computationally intensive than the Fuzzy80 algorithm (although the GIF80/JPEG80 algorithm is more suitable for corrupted images). Therefore, running the Fuzzy80 algorithm, if possible, over GIF80/JPEG80 algorithm saves processing power.

In one embodiment of the invention, both the Fuzzy80 algorithm and the GIF80/JPEG80 algorithm may be run in conjunction with each other in order to cross-validate the algorithm results. In yet another embodiment of the invention, only the GIF80/JPEG80 algorithm is performed on the image and the Fuzzy80 algorithm is omitted. In this embodiment, the image analyzer 104 may not need to determine if the image is corrupted 208.

Returning to the first described embodiment, shown in FIG. 2, once the image analyzer 104 performs the GIF80/JPEG80 algorithm 209 and/or the Fuzzy80 algorithm 210, at 211, the image analyzer 104 determines whether any signatures returned by the preformed algorithm match the signatures of any known spam images.

If the image analyzer 104 does not match the signatures of the current image to any signatures of the previously encountered spam images, then the image analyzer 104 fires a "No Match" feature at 212 to indicate that the image does not have any features. If, however, the image analyzer 104 matches at least one signature of the current image with at least one signature of a previously encountered spam image, then the image analyzer 104 fires the features 107 corresponding to the matched signatures 213. The features 107 may be identified by title, type, a special list, or any other technique for identifying data objects.

As previously stated, once the image features 107 are sent to the model 103, the model 103 attaches weights to the image features 107 (along with the weights of the other features of the email 105), and computes a score 108 to determine if the email 105 is spam (e.g., if the score is above a specified threshold value).

Image Signatures

A "Fuzzy80" algorithm and a "GIF80/JPEG80" algorithm were briefly mentioned above. Different embodiments of these two algorithms will now be described in detail.

An image "signature" is a unique code created by performing a hash on the image data. In one embodiment of the present invention, a Message Direct 5 (MD5) hash function is performed on the image data to create a 128-bit signature. In another embodiment of the invention, a Secure Hash Algorithm (SHA), such as SHA-1, may be used. The present invention should not be limited, though, to a specific algorithm, as almost any hash function (or one-way hash function) may be used to create the image signature.

In order to trick signature-based spam filters, spammers manipulate images in various ways including, for example:
  randomly changing the values of unused entries in the GIF color table;
  appending random data within the image file after the image data; and
  randomly changing the image data in the last few rows of the image.

In contrast to prior art spam filters, the "Fuzzy80" algorithm and the "GIF80/JPEG80" algorithm described below produce a recognizable signature for images that have been manipulated by spammers.

Fuzzy Feature Detection Algorithm (Fuzzy80)

Figure 3:
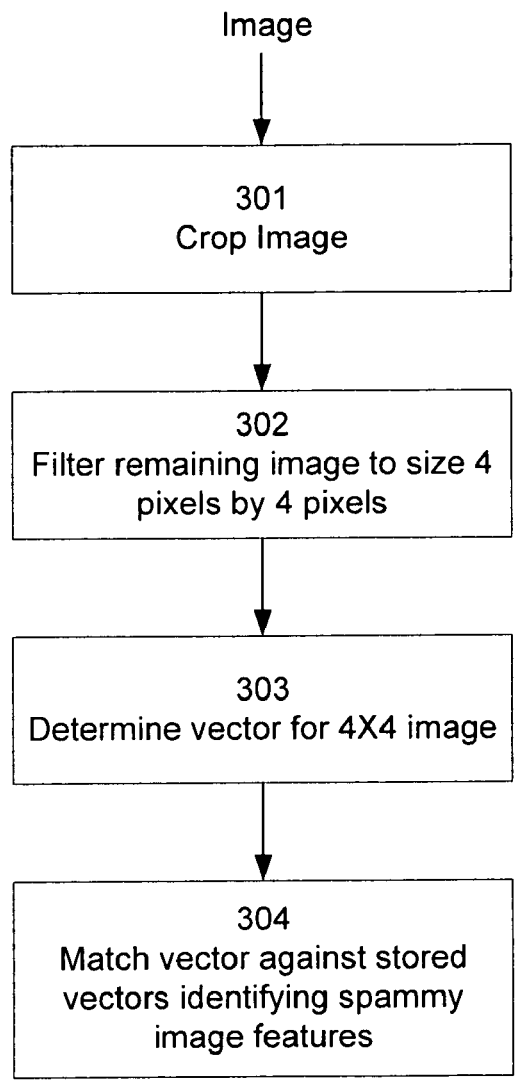
FIG. 3 illustrates the method of the Fuzzy Feature Detection Algorithm (Fuzzy80) described in FIG. 2 and executed by the image analyzer of the message filtering apparatus of FIG. 1.
Figure 4:
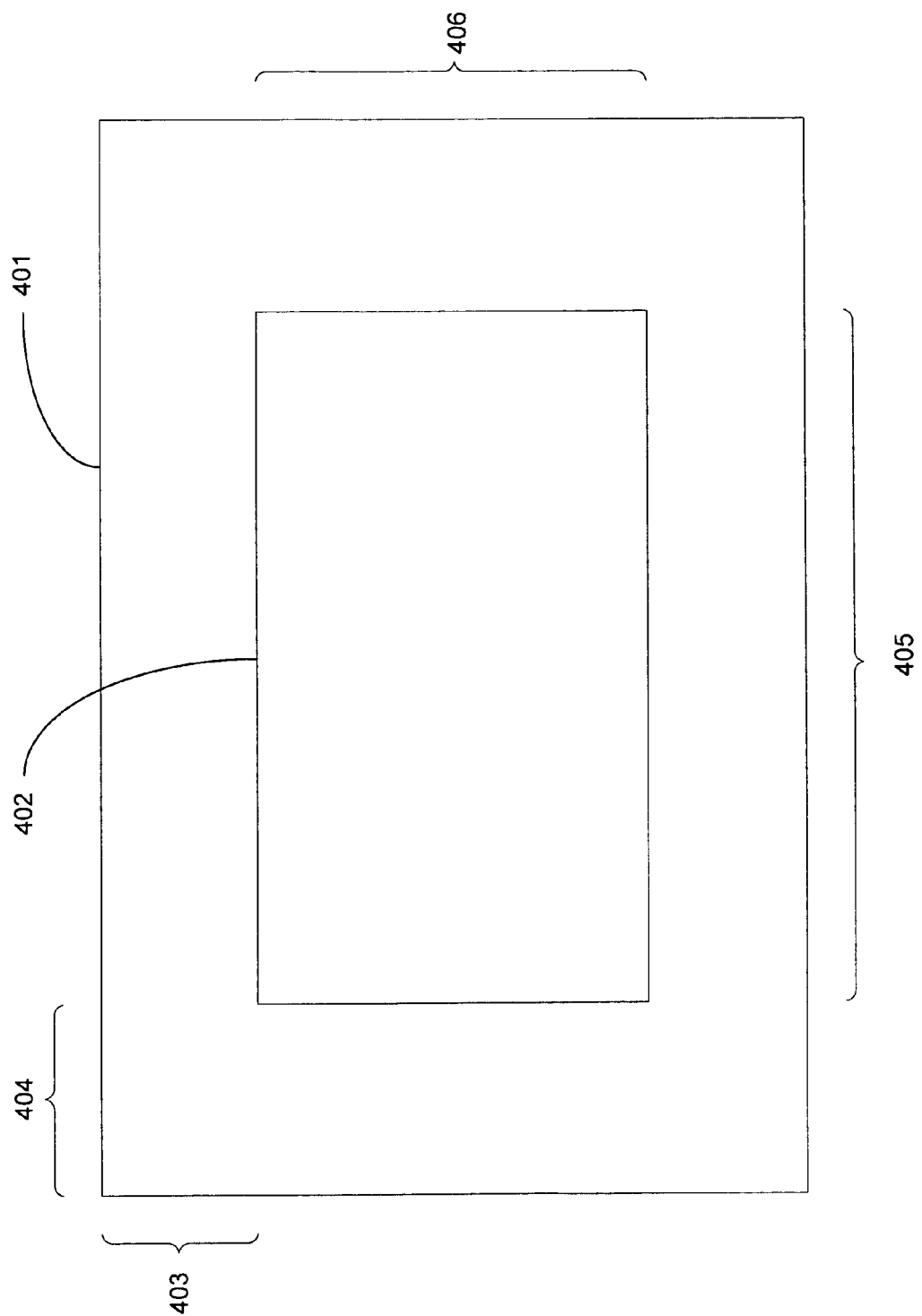
FIG. 4 illustrates one example image cropping method.

FIG. 3 illustrates one embodiment of the Fuzzy80 algorithm. At 301, the image analyzer 104 crops the image. By way of example, in FIG. 4, image 401 is cropped on all four sides of the image to yield the cropped image 402. To crop, the top image data (y-offset percentage) 403 and left image data (x-offset percentage) 404 are removed. In addition, the same amounts of data are removed from the bottom and right sides of the image, yielding an effective image of width of x-limit percentage 405 and an effective height of y-limit percentage 406. In one embodiment of the present invention, the y-offset percentage 403 and x-offset percentage 404 is twenty percent of the height and width of the image. The percentage may be any number, though, and the present invention should not be limited to any particular percentage of image cropping.

Figure 5:
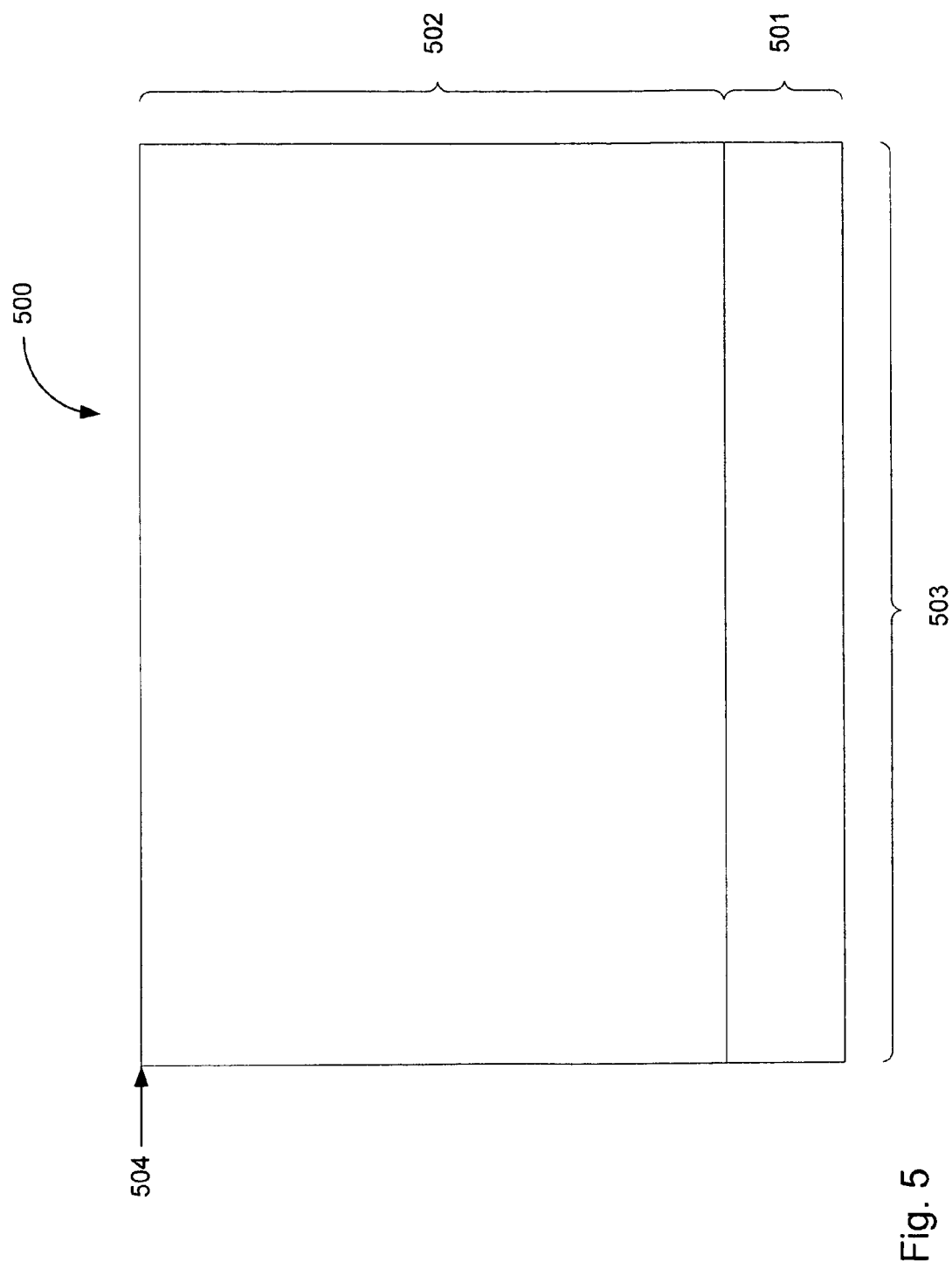
FIG. 5 illustrates another example image cropping method.

FIG. 5 illustrates another exemplary cropping method in which the left, top, and right sides of the image are not cropped. A percentage of the bottom 501 of the image 500 is cropped, leaving an effective image 500 of height 502. In one embodiment of the invention, the percentage is twenty percent of the height of the image 500. However, various other percentages may be employed while still complying with the underlying principles of the invention.

Through cropping of the bottom percentage 501 of the image 500, the width 503 of the image 500 is kept intact. The width 503 may be the original width of the image of email 105 or may be the modified width of the image after pre-processing the image in 204, illustrated in FIG. 2. In addition, the offset 504 of the image 500 is zero.

By cropping the image as described above, the effects of random data appended to the end of the image and/or modifications to the data at the end of the image are removed. Thus, performing a hash function on the remaining image data still produces a recognizable signature.

Referring back to FIG. 3, once the image is cropped, the image analyzer 104 converts the remaining image to an image of size 4×4 pixels at 302. In one embodiment of the present invention, the filtering is a down-conversion or depixelation of the image through a blurring of the image until the image is 16 pixels (4×4) in size. In one embodiment, the image is divided into quadrants, and each quadrant is again divided into quadrants. Then each smaller quadrant's image pixels would be averaged to a representative pixel value for the smaller quadrant. In another embodiment of the present invention, a Gaussian Blur may be performed on the image until 16 definable pixels exist. Various alternate techniques may be used to depixelate the image while still complying with the underlying principles of the invention.

In other embodiments, the image may be converted to a size different than a 4×4 image, such as a 10×10 image. The larger the image after conversion, the more accurate the signature results will be, but more computing resources will be necessary as more points will exist within the image. Thus, the underlying principles of the invention do not depend on the size of the image, as different applications may require different sizes.

Referring back to FIG. 3, once the image is converted, a vector is determined for the converted image at 303. For example, for a converted RGB image of size 4×4, the vector will be 48 numbers since there will be 16 red numbers, 16 blue numbers, and 16 green numbers to describe the colors of the 16 pixels of the image.

Once a vector is created for the converted image, the vector is matched against vectors of known spam images at 304. For the present embodiment of the Fuzzy80 algorithm, the vector of an image is considered the image's "signature."

Figure 6:
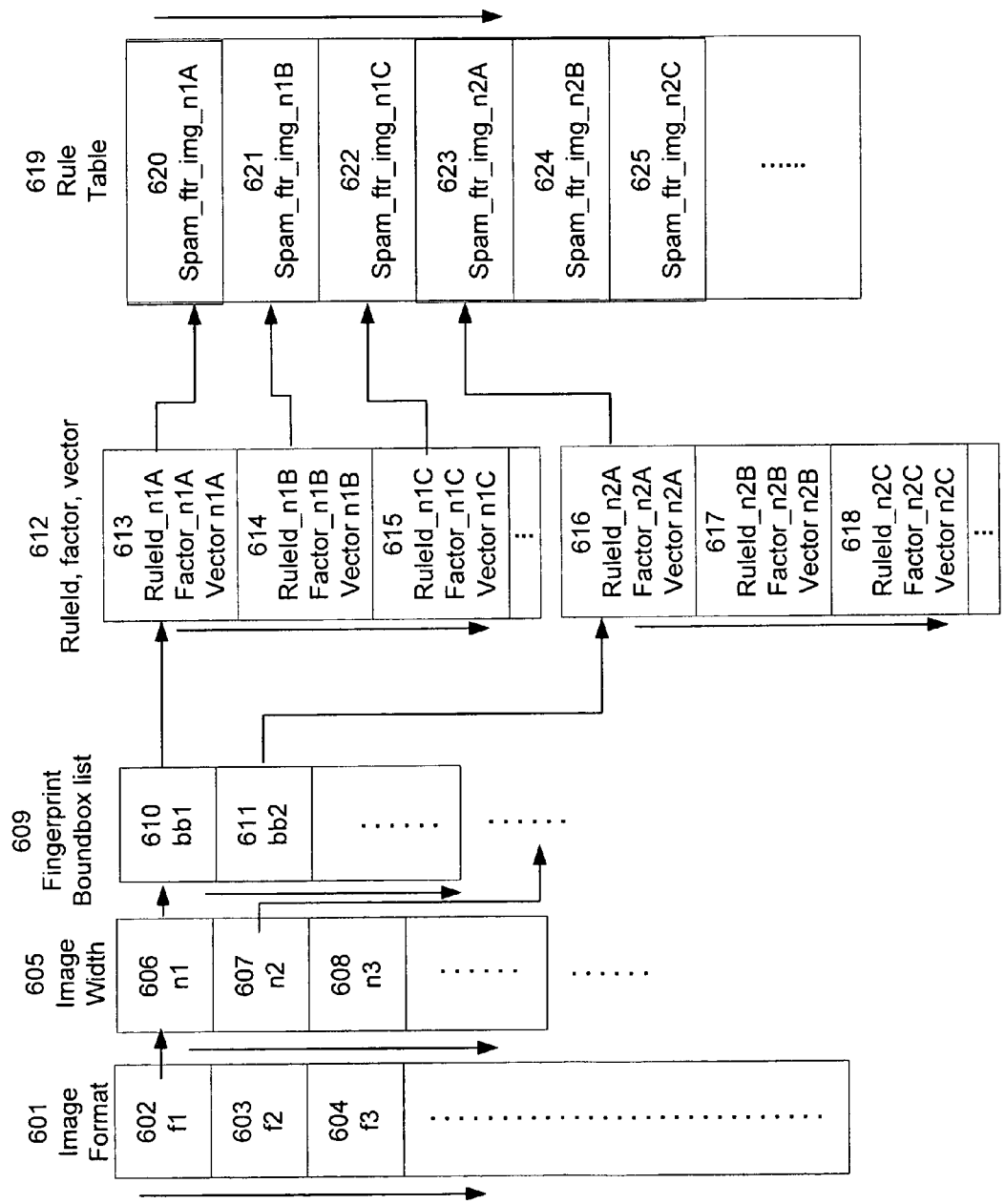
FIG. 6 illustrates the lookup table for the Fuzzy80 algorithm of FIG. 3 to determine features of a present image.

FIG. 6 illustrates one embodiment of comparing the vector of the present image against the vectors of previously encountered spam images. First, the image analyzer 104 determines if any spam images exist that are the format of the present image 601. In one embodiment, the image formats 601 are contained within a hash table indexed by format. If no spam images of the same format exist, then the image analyzer 104 does not need to compare vectors (i.e., because no match is possible if the size does not match). In the example shown in FIG. 6, the different formats are illustrated as f1 602, f2 603, f3 604, and so on.

The image analyzer 104 determines if any spam images exist that have the width of the present image 605. In one embodiment, the image widths 605 are contained within a hash table indexed by width. If no spam images of the same width exist, then the image analyzer 605 does not need to compare vectors. In the example, shown in FIG. 6, the different widths are illustrated as n1 606, n2 607, n3 608, and so on.

Then, the image analyzer 104 crops the present image for each different x-offset, y-offset, x-limit, y-limit listed in the list 609 and the vectors of spam images categorized under these x-offet, y-offset, x-limit, y-limit are compared to the vector of the cropped present image.

For example, as illustrated in FIG. 6, vector n1A 613, n1B 614 and n1C 615 with their rule ids and factors are categorized under format f1 601 and width n1 606 with a list 610 of fingerprint boundbox; vectors n2A 616, n2B 617, and n2C 618 with their rule ids and factors are categorized under format f1 602 and width n1 606 with a list 610 of fingerprint boundbox. In one embodiment of the present invention, the boundbox includes the x-offset, y-offset, x-limit, and y-limit. Thus, under the one embodiment, bb1 610 would include xoffset1, yoffset1, xlimit1, and ylimit1. bb2 611 would include xoffset2, yoffset2, xlimit2, and ylimit2. Hence, if the present image is format f1 with width n1, then the vectors n1A 613, n1B 614, n1C 615, n2A 616, n2B 617, n2C 618, and so on are compared against the present vector using the different fuzzy factors (i.e. thresholds as described below) Factor_n1A, Factor_n1B, Factor_n1C, Factor_n2A, Factor_n2B, Factor_n2C and so on.

In one embodiment, error caused by depixelation is accounted for by comparing vectors to determine if they are within a range of similarity instead of being exactly the same. For example, in one embodiment of the present invention, the image analyzer 104 determines if the absolute differences between the numbers of the two vectors are cumulatively below a specified threshold. For example, in comparing two 48 number vectors, the first number of each vector is compared, then the second number, and the third, and so on, until all numbers of both vectors are compared. Then, the absolute difference between the first numbers is added to the absolute difference between the second numbers, which is added to the absolute difference between the third numbers, etc, until all of the absolute differences are added together. If the sum is less than a specific numerical threshold, then the two vectors are considered a "match." If the sum is greater than the threshold, then the two vectors are considered to not match. FIG. 6A illustrates a specific example of the process using two 8 number vectors. The threshold is arbitrarily set to 40 in this example.

In one embodiment of the invention, the threshold is five times the size of the vector. Therefore, on average, each position of the present vector must be within five numbers of the equivalent position of a compared vector in order for there to exist a match. In addition, in one embodiment of the invention, multiple thresholds for segments of the vectors exist, and other means of comparing the vectors may exist.

A present vector may match multiple vectors of known spam images. Therefore, the present vector is compared to all of the vectors categorized under the same list 609 When a match is determined, the features corresponding to the matching vector are determined.

As illustrated in FIG. 6, an array of features corresponding to the vectors 619 is maintained. In the illustrated example, feature Spam_ftr_img1_n1A 620 corresponds to vector n1A 613; feature Spam_ftr_img1_n1B 621 corresponds to vector n1B 614; feature Spam_ftr_img1_n1C 622 corresponds to vector n1C 615; and so on. In other embodiments, more than one feature corresponds to a vector. The names given to the features 620-625 illustrated in FIG. 6 may be any type of identifier to identify the feature. Thus, no special format of the feature identifier is required by the present invention.

Once all of the matching features are determined, the image analyzer sends the features as image features (213 of FIG. 2) to the model 103 in order to compute the score 108.

The underlying principles of the invention do not depend on the bit level of color. Therefore, any number of bits for color depth may be used (e.g., 16, 32, 64, 128, 256, etc., shades of red, green, and blue). In addition, any format of the pixel definition may be used, such as YMV (creating a 48 number vector for 16 pixels) or a static color table (creating a 16 bit vector for 16 pixels).

GIF/JPEG Feature Detection Algorithm
(GIF80/JPEG80)

In one embodiment of the present invention, the image analyzer 104 first determines whether the present image is a GIF or a JPEG. If the image is a GIF, the image analyzer 104 runs the GIF80 algorithm (illustrated by FIG. 7). If the image is a JPEG, the image analyzer 104 runs the JPEG80 algorithm (illustrated in FIG. 10). If the image is neither GIF nor JPEG, the image analyzer may attempt to execute one of the algorithms or a separate algorithm for the different type image.

GIF80 Algorithm

Figure 7:
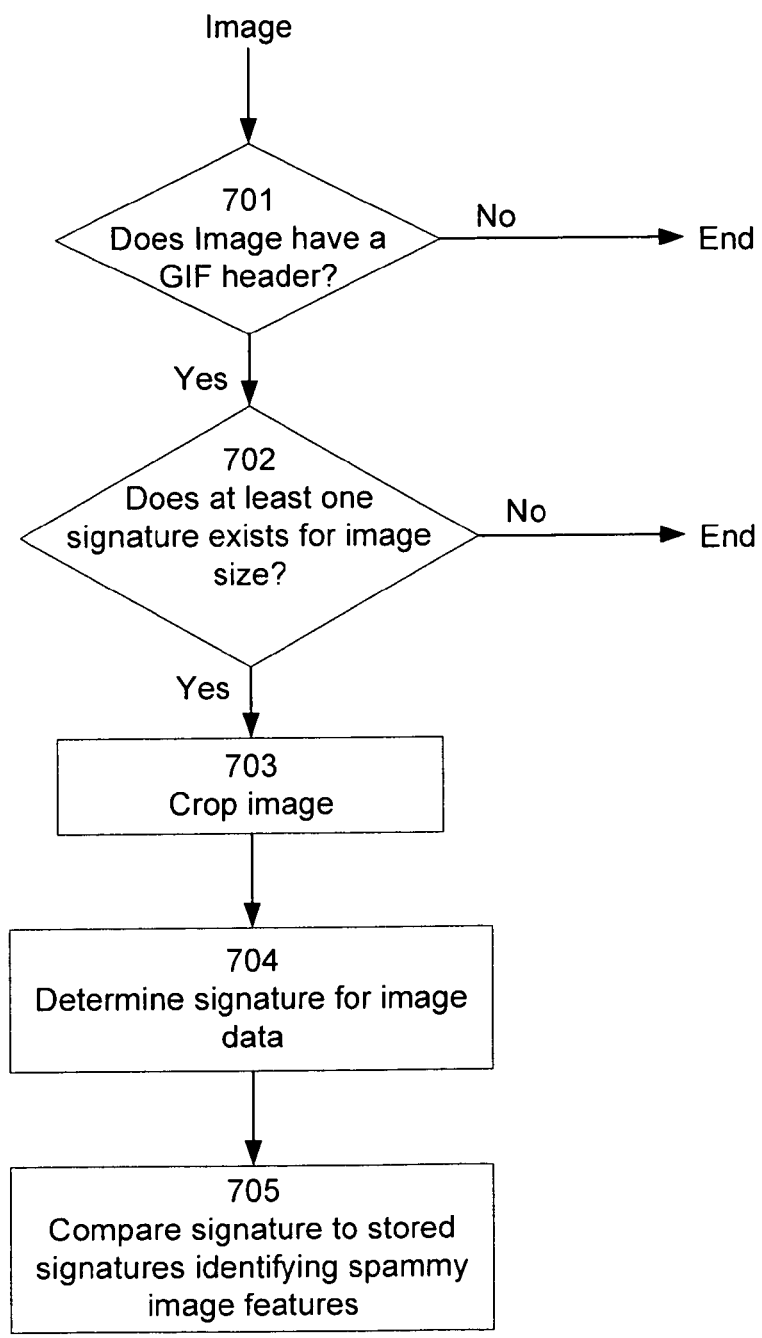
FIG. 7 illustrates the method of the GIF portion/algorithm (GIF80) of the GIF/JPEG Feature Detection Algorithm (GIF80/JPEG80) described in FIG. 2 and executed by the image analyzer of the message filtering apparatus of FIG. 1.
Figure 8:
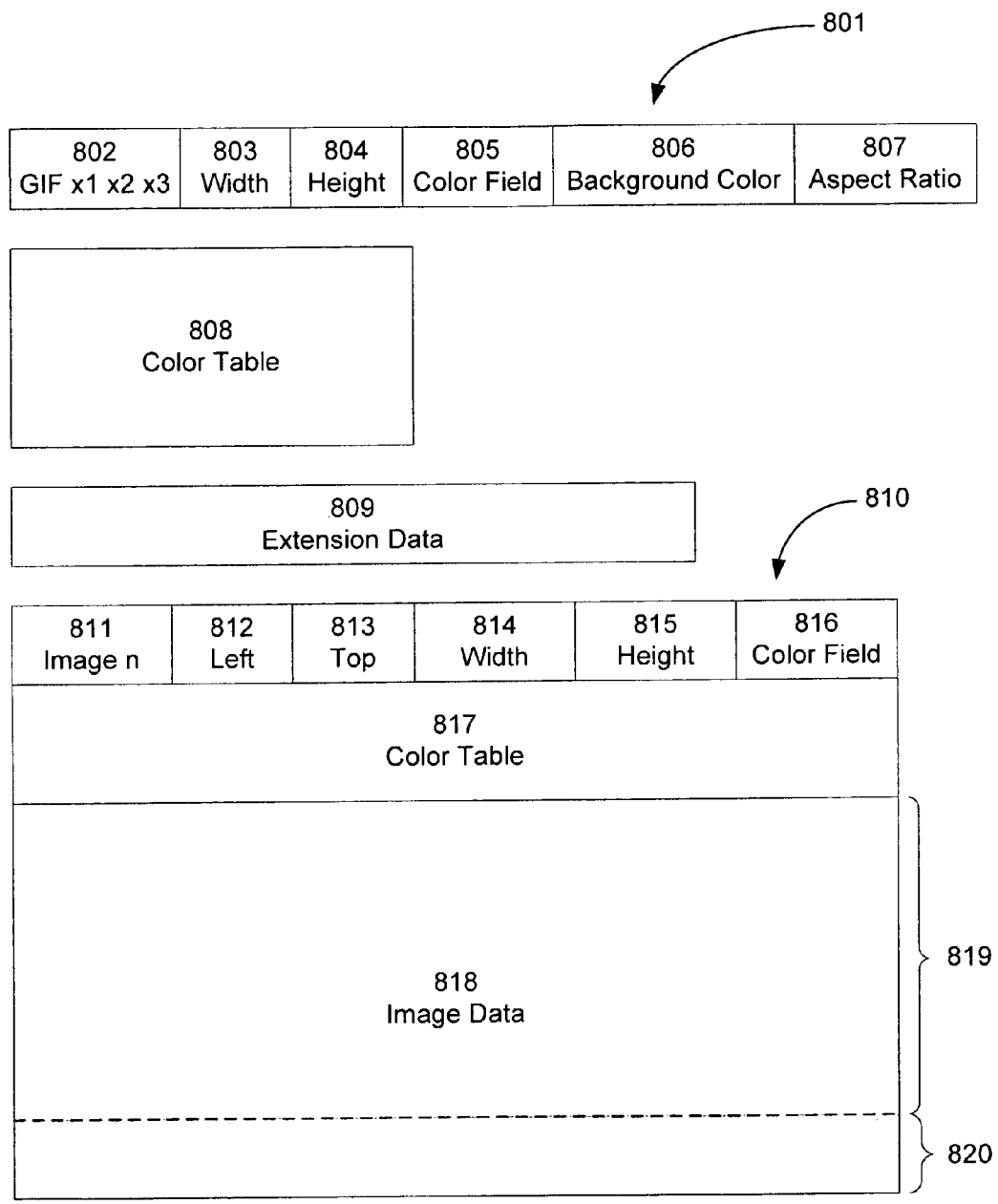
FIG. 8 illustrates the typical format of a GIF.

FIG. 7 illustrates one embodiment of the GIF80 algorithm and FIG. 8 illustrates an exemplary format of a GIF image. The GIF format includes a header 801, which includes a six byte tag 802 to indicate if the image is a GIF, an overall width field 803, an overall height field 804, an overall color field 805, a background color field 806, and an aspect ratio field 807. The GIF further includes an overall color table 808, and extension data 809.

If the image is a "moving" image or multiple images shown in succession to simulate motion, the above information is typically universal to all of the images within the sequence of images for the "moving" image. In one embodiment, the image analyzer 104 may analyze only the first image in the stack of images. Alternatively, the image analyzer 104 may analyze any image in the stack or may analyze any number of the images in the stack.

Referring back to FIG. 8, the specific information defining the GIF image 810 includes the image identification (e.g., Image n of N) 811, the left position of the image 812, the top position of the image 813, the width of the image 814, the height of the image 815, the color field of the image 816, the color table of the image 817, and the image data 818. In one embodiment, for the image preprocessing operation 204 mentioned above, the image analyzer 104 retrieves or expands the width 814 (rather than the overall width 803).

In one embodiment of the invention, the image analyzer determines if a GIF is manipulated by comparing the overall width 803 to the width 814, the overall height 804 to the height 815, the overall color field 805 to the color field 816, and/or the overall color table 808 to the color table 817. Compared fields that do not match may indicate that the GIF has been manipulated.

Referring back to FIG. 7, the image analyzer 104 attempts to identify the GIF header 802. If the image does not have a GIF header 802, then the GIF80 algorithm is not performed on the image. If the image has a GIF header 802, then the image analyzer 104 determines if at least one signature of a spam image of the same size as the present GIF image exists. As previously described, the size may be the actual width 814 of the GIF, or the size may be the expanded width of the GIF generated through preprocessing (operation 204 of FIG. 2).

If no signature exists for a spam image of the same size as the present image, then the GIF80 algorithm is ended. If, however, a signature exists for a spam image of the same size as the present image, then the image analyzer 104 crops the image 703. The image may be cropped as previously discussed under the Fuzzy80 algorithm and illustrated in FIGS. 4 and 5. If the image is cropped as per FIG. 5, a portion 820 of the image data 818 will be cropped out, leaving the effective image data 818 shown in FIG. 8.

Once the image is cropped, the image analyzer determines the signature for the image data 704. As previously described, the signature is determined by performing a hash (e.g., MD5 algorithm) on the effective image data 819 of the GIF. Once the signature is determined for the image, the image analyzer 104 compares the determined signature to signatures of previously encountered spam images to identify features of the present image.

Figure 9:
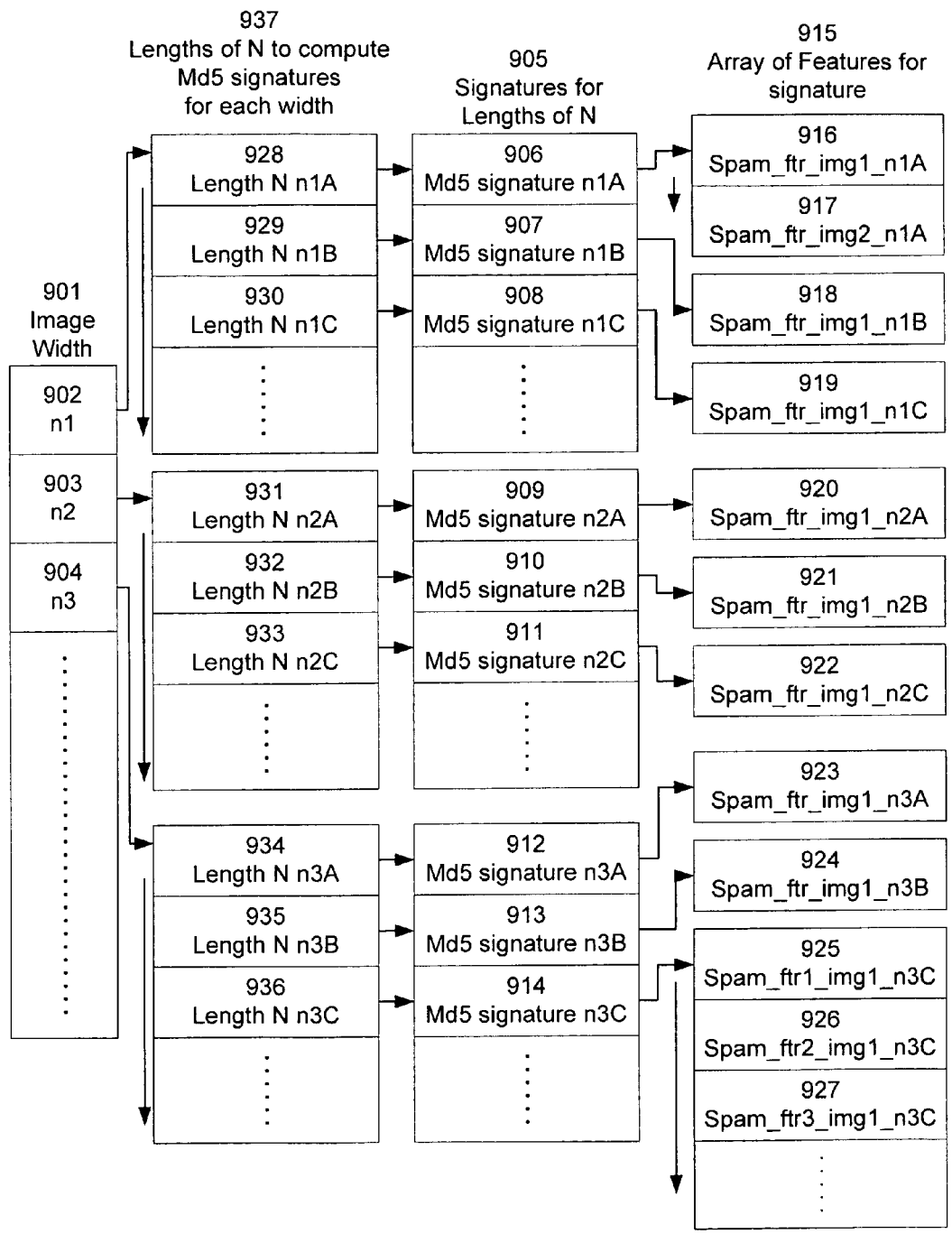
FIG. 9 illustrates the lookup table for the GIF80 algorithm of FIG. 7 to determine features of the present image.

FIG. 9 illustrates one embodiment of the image analyzer 104 comparing the determined signature of the present image to stored signatures of previously encountered spam images. In the embodiment illustrated in FIG. 9, a signature is derived by performing the MD5 hash algorithm on an image.

First, the image analyzer 104 compares the width of the present image to the widths used to categorize the stored signatures 901. As described above, the signatures may be stored in the form of a hash table indexed by width. The widths illustrated are n1 902, n2 903, and n3 904, etc. The image analyzer 104 uses the image width array 901 to determine if the present image width is the same width as any previously encountered spam images. Alternative to width, other size measurements may be used to categorize stored signatures 901, such as height and overall number of pixels.

As illustrated in FIG. 9, groups of MD5 signatures 905 are identified via entries in the image width hash table 901 and lengths of N bytes 937 of the corresponding widths over which the MD5 signatures 905 are computed. For example, MD5 signature n1A 906, MD5 signature n1B 907, and MD5 signature n1C 908 correspond to byte length N of n1A 928, n1B 929, and n1C 930, respectively, of image width n1 902; MD5 signature n2A 909, MD5 signature n2B 910, and MD5 signature n2C 911 correspond to byte length N of n2A 931, n2B 932, and n2C 933, respectively, of image width n2 903; and MD5 signature n3A 912, MD5 signature n3B 913, and MD5 signature n3C 9013 correspond to byte length N of n3A 934, n3B 935, and n3C 936, respectively, of image width n1 904. As in the Fuzzy80 algorithm, any number of signatures may correspond to each width in the Image Width array 901.

For the GIF80 algorithm, the determined signature of the present image may be compared with spam signatures for an exact match.

By way of example, and not limitation, if the present image is of size n1 902, the signature of the present image may be compared to all of the signatures 906-908, etc, identified by that size. In another embodiment of the present invention, the image analyzer 104 may stop comparing signatures once an exact match is found.

Once all of the matches for the signature of the present image have been determined, the features 915 corresponding to the matching signatures are fired by the image analyzer 104 and corresponding weights are assigned by the model 103. In the specific example of FIG. 9, features Spam_ftr_img1_n1A 916 and Spam_ftr_img2_n1A 917 correspond to MD5 signature n1A 906, and so on. FIG. 9 also illustrates that multiple features may be associated with one signature.

JPEG80

Figure 10:
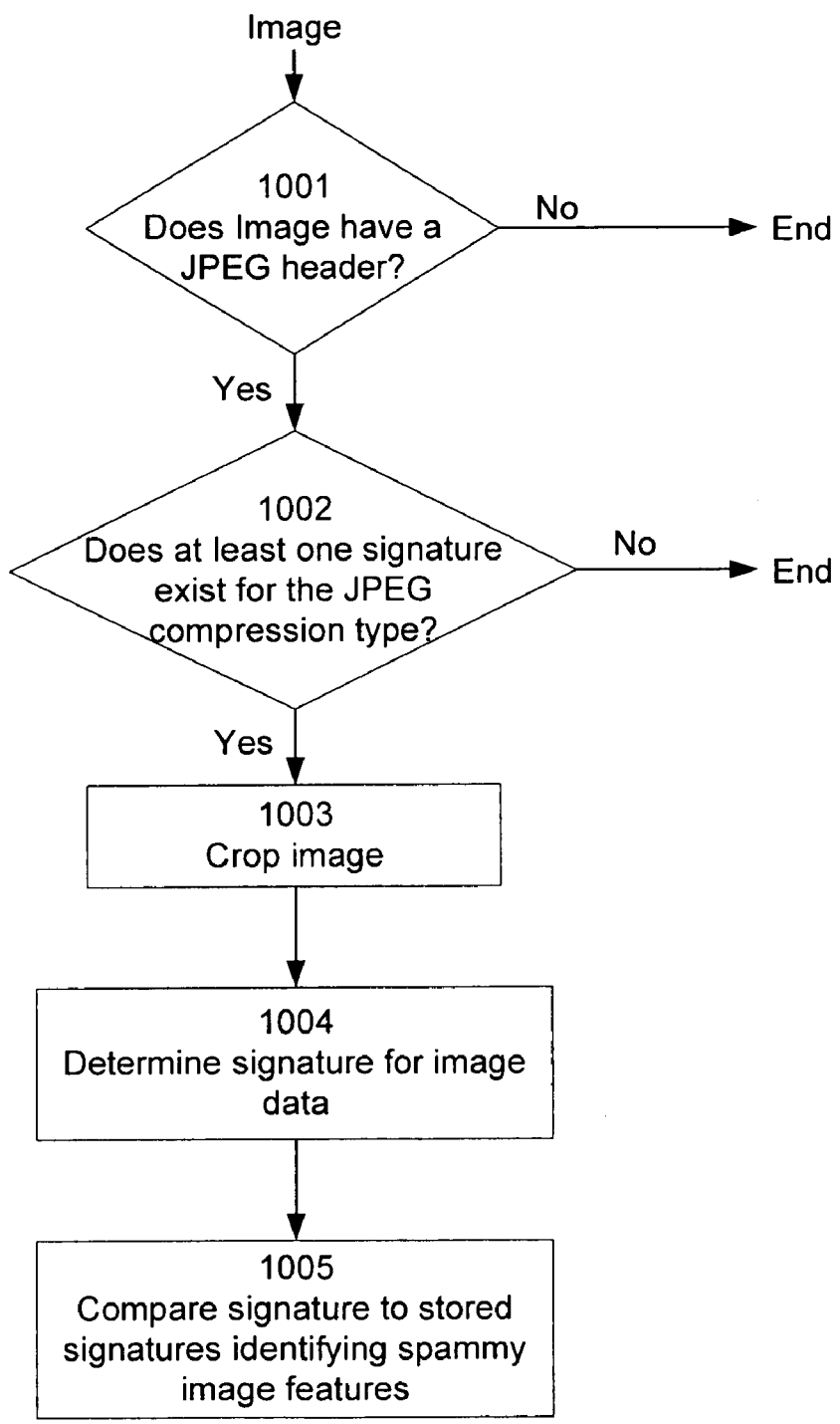
FIG. 10 illustrates the method of the JPEG portion/algorithm (JPEG80) of the GIF/JPEG Feature Detection Algorithm (GIF80/JPEG80) described in FIG. 2 and executed by the image analyzer of the message filtering apparatus of FIG. 1.
Figure 11:
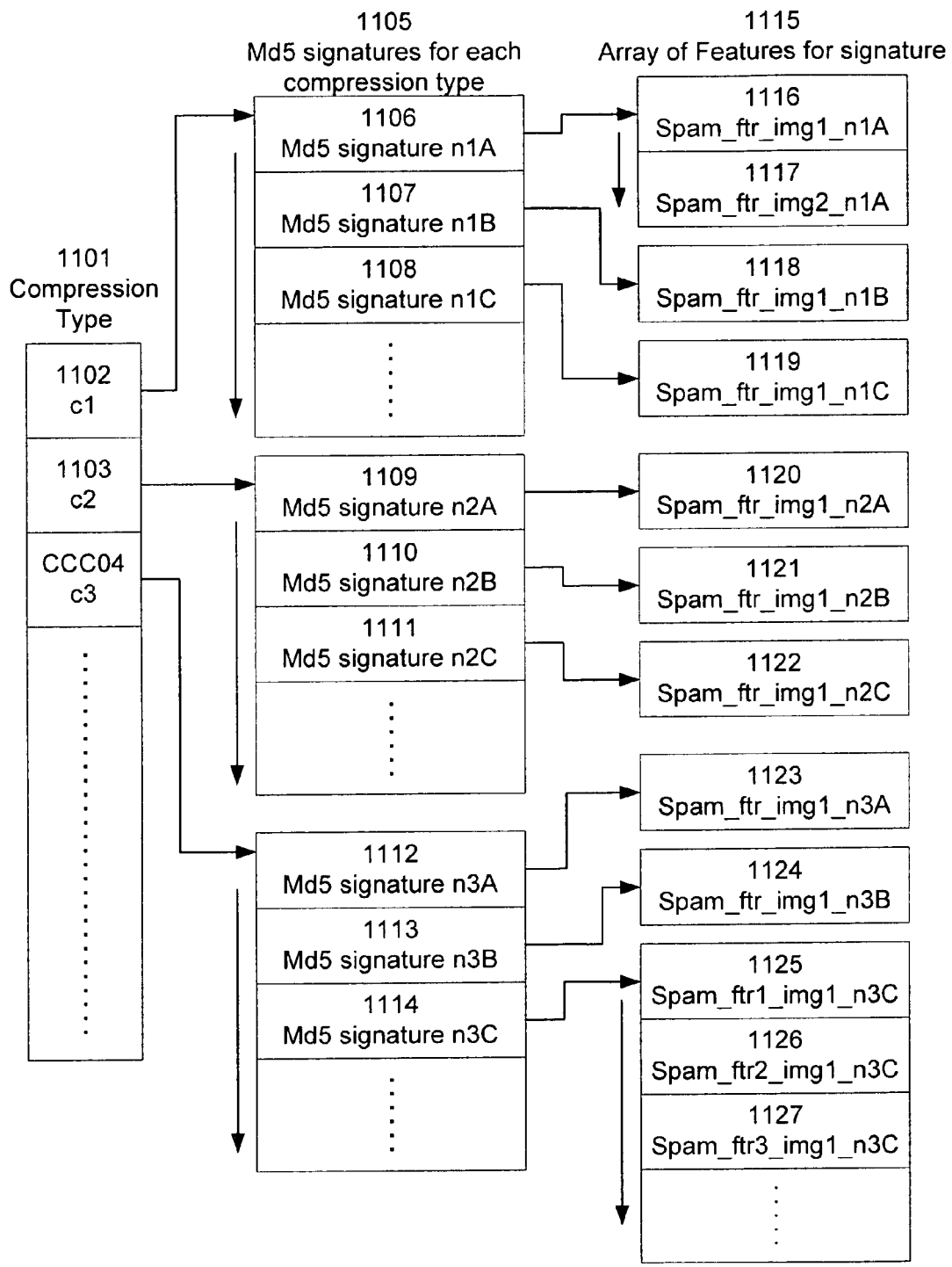
FIG. 11 illustrates the lookup table for the JPEG80 algorithm of FIG. 10 to determine features of the present image.

Referring to FIG. 10, the JPEG80 algorithm is similar to the GIF80 algorithm, the primary different being that the GIF80 algorithm categorizes signatures by image width while the JPEG80 algorithm categorizes signatures by image compression type. FIG. 11 illustrates a lookup table for JPEG images which is similar to the lookup for GIFs (FIG. 9) but which categorizes JPEGs based on compression type.

In other embodiments of the present invention, the image analyzer 104 categorizes signatures of JPEGs by image width.

Figure 12:
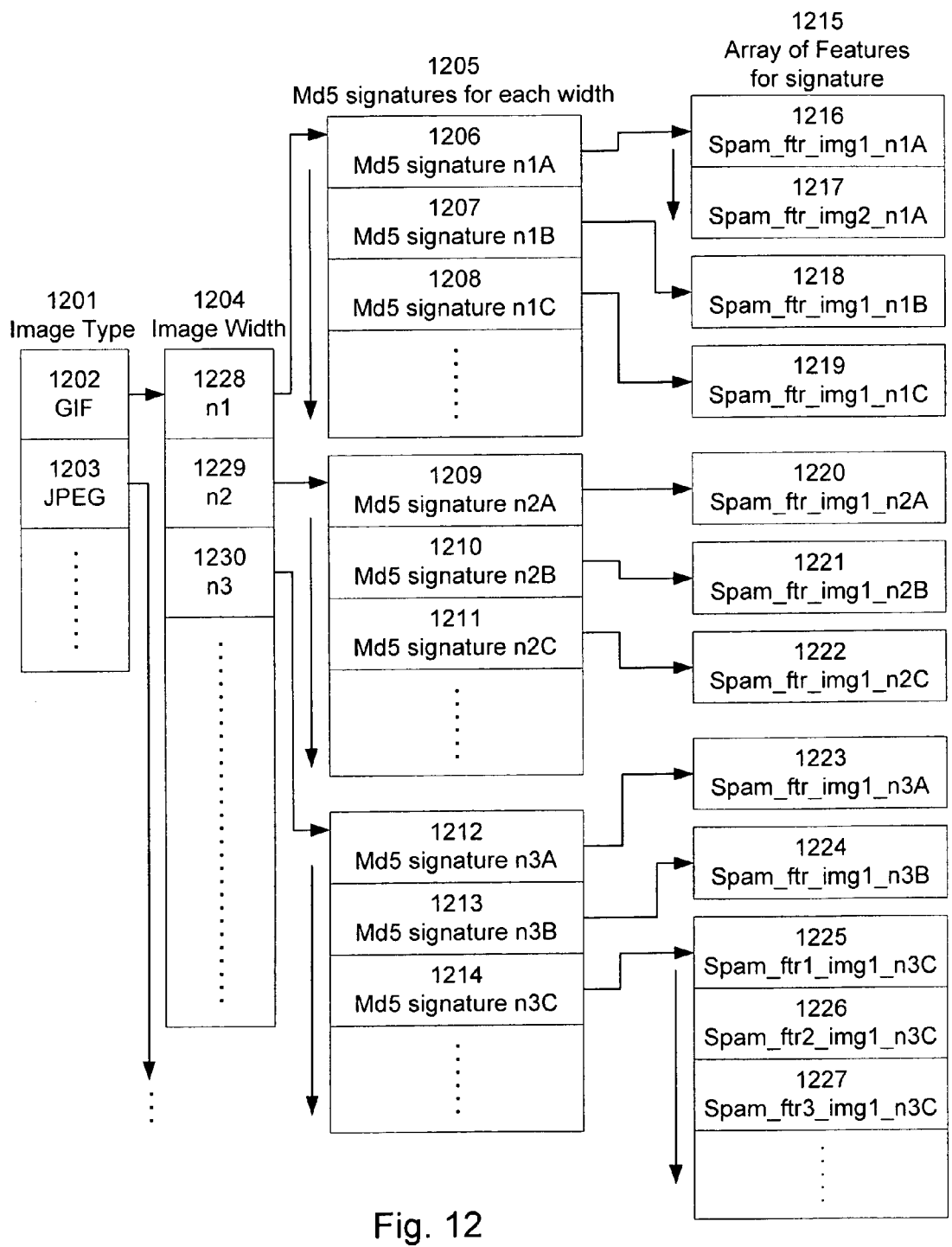
FIG. 12 illustrates a combined lookup table for the GIF80 algorithm and the JPEG80 algorithm, combining the lookup tables illustrated in FIGS. 9 and 11.

FIG. 12 illustrates a series of data structures employed by both the GIF80 algorithm and the JPEG80 algorithm. A first lookup table 1201 categorizes images by image type. The entries in the first lookup table point to other sub-tables which are indexed based on different image features (e.g., width, compression type, etc). For example, if the present image is a GIF, then a lookup sub table 1204 indexed by image width is identified (e.g., similar to the lookup table in FIG. 9). Similarly, if the present image is a JPEG, then the lookup sub table (not shown) may be the lookup table of FIG. 11.

Embodiments of the invention may include various steps as set forth above. The steps may be embodied in machine-executable instructions which cause a general-purpose or special-purpose computer processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Moreover, the underlying principles of the invention may be implemented within virtually any type of computing platform including standalone personal computer configurations and server configurations.

What is claimed is:

1. A computer-implemented method for determining spam features of a present image, comprising:

determining if the present image is oversized and, if so, then classifying the present image as oversized refraining from additional analysis of the present image;

preprocessing the present image if the image is not oversized, the preprocessing including analyzing the present image to obtain an image format, image width, image height and image size;

determining if the image is of a type which is supported and, if not, then classifying the image as unsupported, and refraining from performing any additional analysis of the image;

using a characteristic of the present image, whether corrupted, or not corrupted, as an index to a table having stored characteristics of known spam images, wherein the characteristic includes one or more of the image format, image, width, image height and image size;

performing the following additional operations only if a match exists between the characteristic of the present image and one of the stored characteristics of known spam images:

determining if the image is corrupted and, if the image is not corrupted, then performing a first set of operations which create a non-fuzzy signature of the present image and, if the image is corrupted, then performing a second set of operations which create a fuzzy signature of the image;

comparing the fuzzy or non-fuzzy signature to stored signatures of known spam images, the stored signatures of known spam images having been previously generated from spam images having the same characteristic as the present image;

determining spam features corresponding to the stored signatures of spam images that match the signature of the present image;

wherein generating a signature of the present image includes performing a one-way hash function on the image.

2. The method of claim 1, wherein the hash function is the Message Digest 5 (md5) hash function.

3. The method of claim 1, wherein the characteristic further includes a size of the image.

4. The method of claim 1, wherein the closest value is greater than or equal to the width of the present image.

5. The method of claim 1, wherein the characteristic includes a compression type of the image.

6. The method of claim 1, wherein generating the signature of the present image includes cropping the present image.

7. The method of claim 6, wherein a bottom portion of the present image is cropped out, the remaining image being the present image minus the bottom portion.

8. The method of claim 7, wherein an amount of the bottom portion of the present image to be cropped out is twenty percent of the height of the present image.

9. The method of claim 6, wherein all edges of the present image are cropped out.

10. A computer-implemented method for determining spam features of an image, comprising:

determining if the present image is oversized and, if so, then classifying the present image as oversized refraining from additional analysis of the present image;

preprocessing the present image if the image is not oversized, the preprocessing including analyzing the present image to obtain an image format, image width, image height and image size;

determining if the image is of a type which is supported and, if not, then classifying the image as unsupported, and refraining from performing any additional analysis of the image;

using a characteristic of the present image, whether corrupted, or not corrupted, as an index to a table having characteristics of known spam images, wherein the image is a JPEG image and the characteristic includes at least a width of the JPEG image;

performing the following additional operations only if a match exists between the characteristic of the present image and one of the stored characteristics of known spam images:

determining if the image is corrupted and, if the image is not corrupted, then performing a first set of operations which create a non-fuzzy signature of the present image and, if the image is corrupted, then performing a second set of operations which create a fuzzy signature of the image;

comparing the signature to stored signatures of known spam images, the stored signatures of known spam images having been previously generated from spam images having the same characteristic as the present image;

determining spam features corresponding to the stored signatures of spam images that match the signature of the present image; and wherein generating a signature of the present image includes performing a one-way hash function on the image.

11. The method of claim 10, wherein the hash function is the Message Digest 5 (md5) hash function.

12. The method of claim 10, wherein the characteristic further includes is a size of the image.

13. The method of claim 10 further comprising:

converting the width of the JPEG image to a closest value of a predefined interval of widths; and performing the following additional operations only if a match exists between the converted width of the present JPEG image and a converted width of known spam images:

generating a signature of the present JPEG image;

comparing the signature to stored signatures of known spam images, the stored signatures of known spam images having been previously generated from spam images having the same characteristic as the present JPEG image; and determining spam features corresponding to the stored signatures of spam images that match the signature of the present JPEG image.

14. The method of claim 10, wherein the characteristic includes a compression type of the JPEG image.

15. The method of claim 10, wherein generating the signature of the present JPEG image includes cropping the present image.

* * * * *